Oct. 22, 1957     E. LATTA ET AL     2,810,294
ELECTRIC WINDSHIELD WIPER APPARATUS
Filed Jan. 12, 1954     4 Sheets-Sheet 1
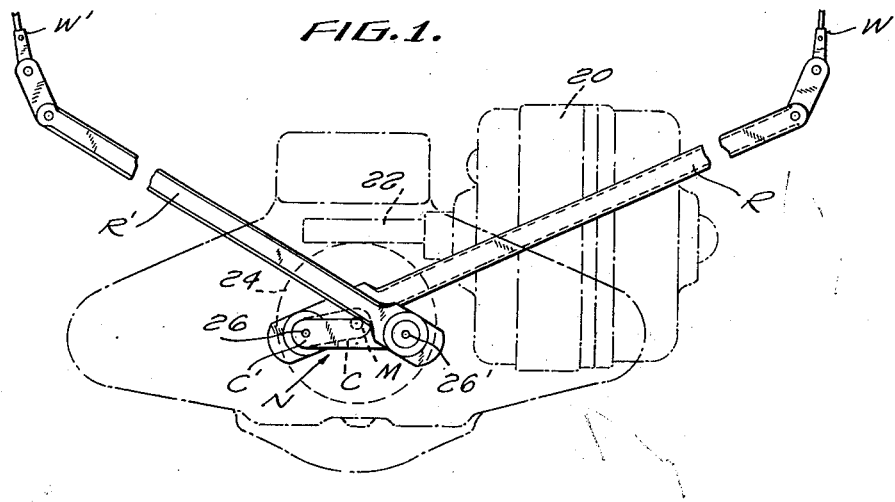
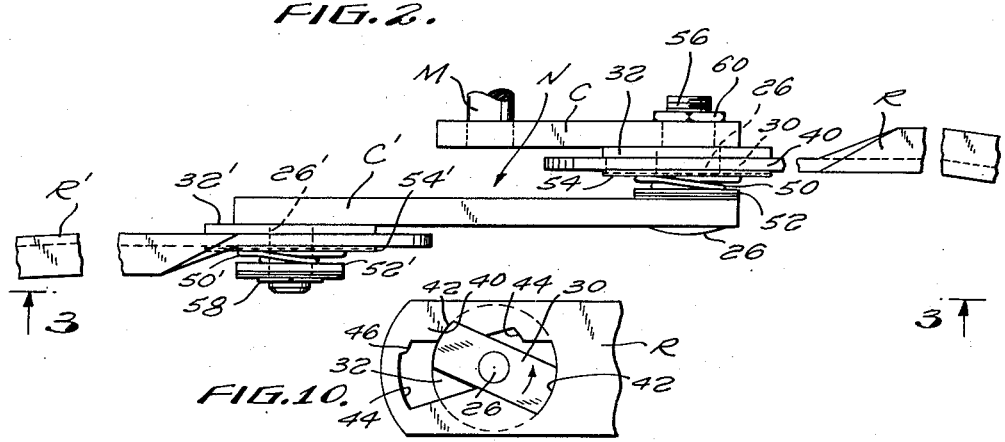
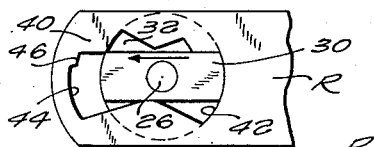
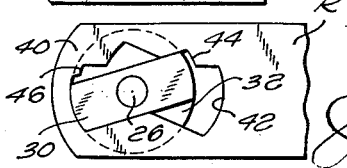
INVENTORS
EDWARD LATTA
BASIL JONES
BY
ATTORNEYS

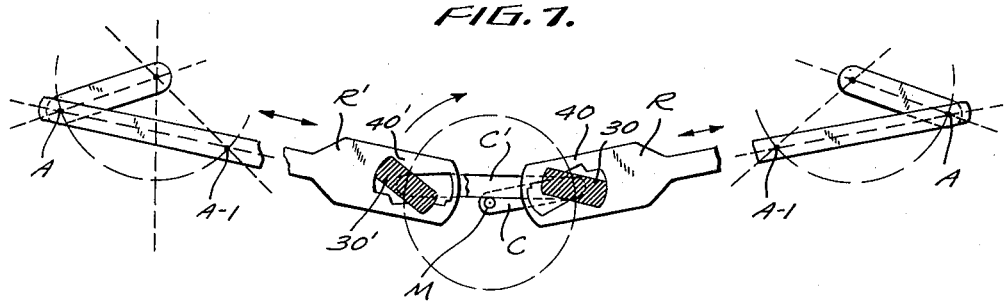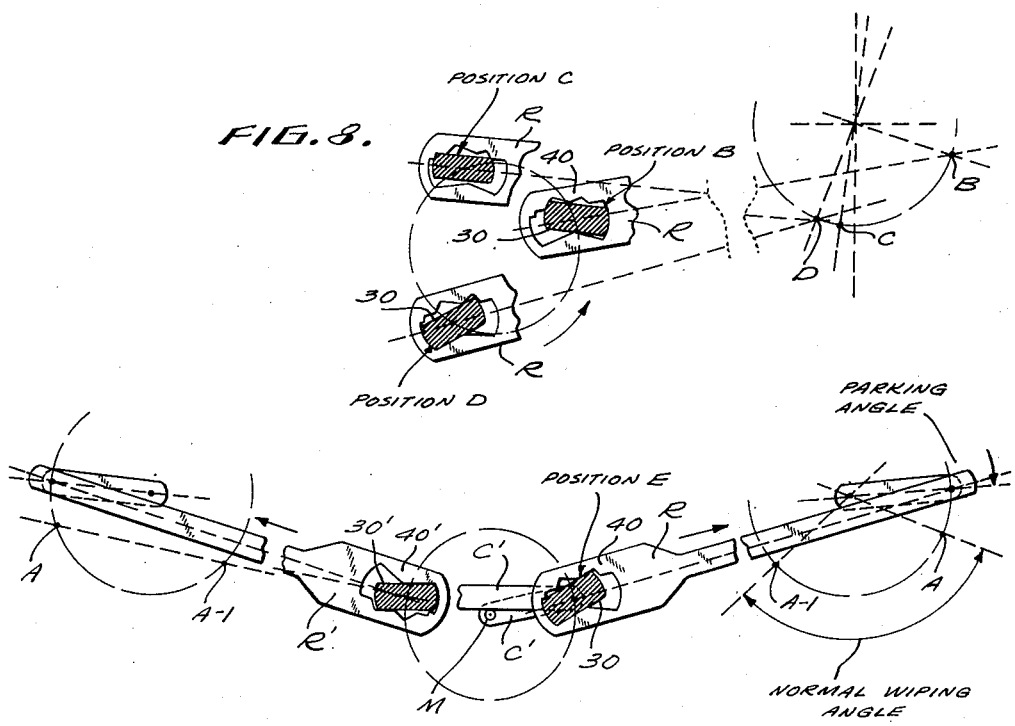

Oct. 22, 1957  E. LATTA ET AL  2,810,294
ELECTRIC WINDSHIELD WIPER APPARATUS
Filed Jan. 12, 1954  4 Sheets-Sheet 4
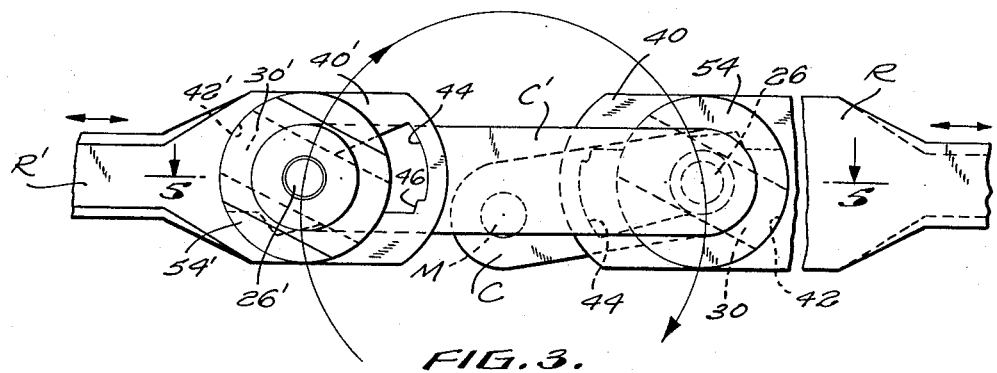
FIG.3.
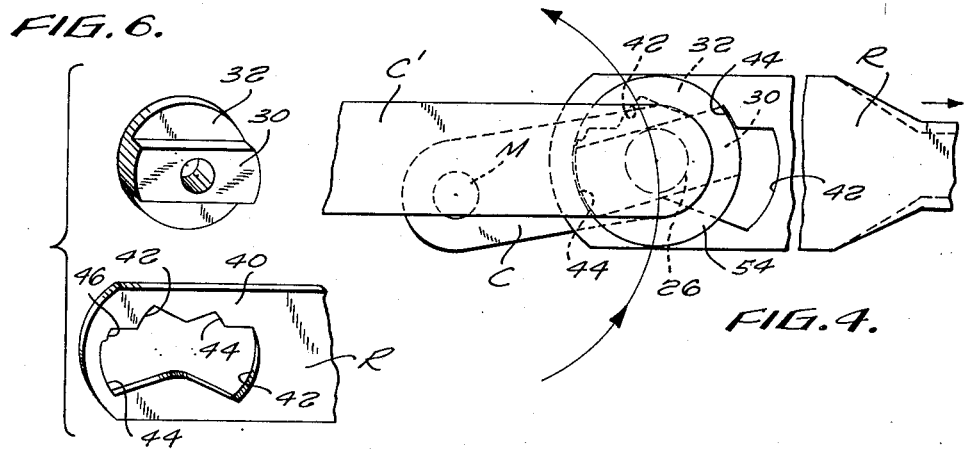
FIG.6.
FIG.4.
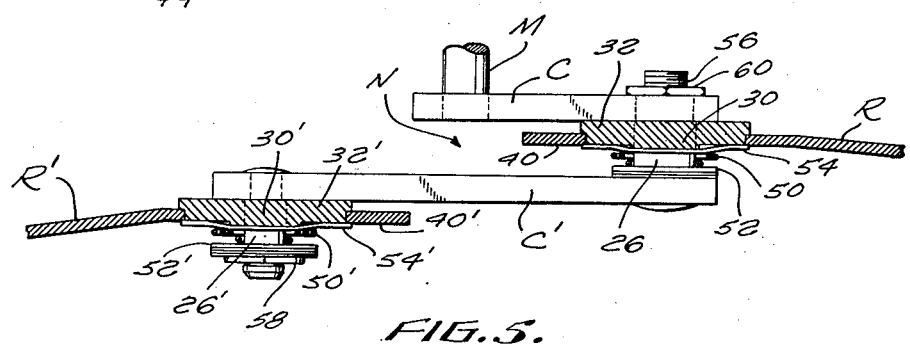
FIG.5.
INVENTORS
EDWARD LATTA
BASIL JONES
BY
ATTORNEYS

United States Patent Office 2,810,294
Patented Oct. 22, 1957

2,810,294

ELECTRIC WINDSHIELD WIPER APPARATUS

Edward Latta, Owosso, and Basil Jones, Durand, Mich., assignors to Redmond Company, Inc., Owosso, Mich., a corporation of Michigan Application January 12, 1954, Serial No. 403,552

6 Claims. (Cl. 74—75)

This invention relates to improvements in electric windshield wiper apparatus.

The prime object of the present invention centers about the provision of an improved apparatus for connecting a reversible motor-operated shaft with an oscillatable windshield wiper mechanism operative for moving windshield wipers between a normal operating condition and a parked position upon a reversal of direction of operation of the motor.

In the apparatus of the invention, the motor-operated shaft is connected to the windshield wiper mechanism by a rotatable crank arm fixed to the shaft and a reciprocable connecting rod linking the free end of the crank arm to the oscillatable windshield wiper mechanism; and for operating two windshield wipers in synchronism, there is employed a compound crank having two crank arms extending in opposite directions from the motor-operated shaft, the free ends of the crank arms being linked one to one of the windshield wipers and the other to the other windshield wiper by similar but oppositely disposed reciprocable connecting rods.

In carrying out the object of the invention, the apparatus features the provision of a locking mechanism located at the connection between the free end of the crank arm and the connecting rod, the elements of which are shiftable between two locking positions, shifting of these elements from one to the other locking position taking place upon reversal of direction of operation of the motor and having the effect of shifting the stroke of the connecting rod, and hence that of the windshield wiper, between a normal running condition and a parking position.

To the accomplishment of this object and such other objects as may hereinafter appear the invention relates to the combination apparatus as sought to be defined in the appended claims, taken together with the following description and shown in the accompanying drawings, in which:

Fig. 1 is a front elevational view showing schematically the apparatus of the present invention in an applied state;

Fig. 2 is a plan view of the essential elements of the apparatus of the present invention shown on a more enlarged scale;

Fig. 3 is a front elevational view taken in the plane of line 3—3 of Fig. 2 and showing the parts of the apparatus in a position during a normal running cycle;

Fig. 4 is a view similar to Fig. 3 of a part of the apparatus shown in Fig. 3 and showing the same in a position during a parking cycle;

Fig. 5 is a view similar to that shown in Fig. 2 but with certain parts shown in cross-section;

Fig. 6 is an exploded view in perspective of the essential parts of the locking mechanism of the apparatus;

Figs. 7, 8 and 9 are diagrammatic or schematic views showing the position of the essential parts of the apparatus during a normal running cycle and during a reversing (parking) cycle of the apparatus;

Figs. 10 through 12 are diagrammatic or schematic views of the locking mechanism of the apparatus showing the parts moving through a parking cycle.

Figure 13:
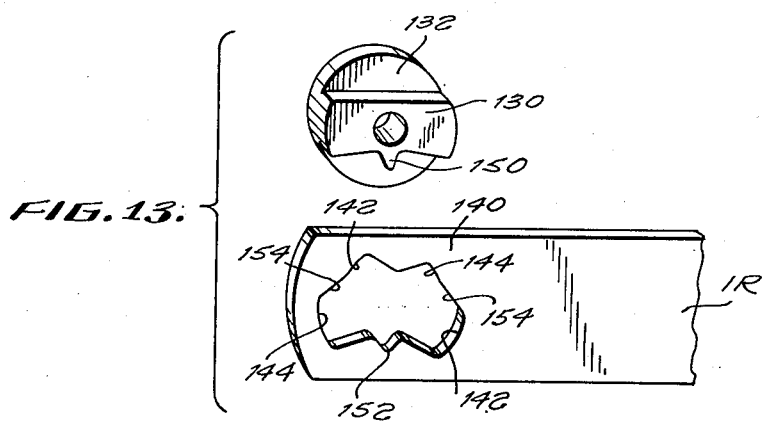
Figs. 13 to 16 are views corresponding to Figs. 6 and 10 to 12, but showing a modified form.

Referring now more in detail to the drawings, and having reference first to Fig. 1 which shows the mode of application or use of the apparatus of the present invention, the apparatus comprises a linkage mechanism generally designated as N for connecting a motor-operated shaft M with the right and left oscillatable windshield wiper devices W and W'. The shaft M is driven by an electric motor 20 through reduction gearing schematically illustrated by the worm 22 and worm wheel 24.

Referring now more particularly to Fig. 2 of the drawings, the linkage mechanism N comprises a compound crank consisting of a first crank arm C fixed to the motor-operated shaft M, a second crank arm C' fixed to and rotatable with the crank arm C, the two crank arms extending in opposite directions with reference to the axis of rotation of the shaft M, and being united together by means of the crank pin 26, a connecting rod R linking the free end of the crank arm C with the right hand windshield wiper W and a connecting rod R' linking the free end of the crank arm C' with the left hand windshield wiper W'.

Each crank arm is connected to its associated connecting rod by a locking mechanism located at the connection between the free end of the crank arm and the connecting rod, the elements of which are shiftable between two locking positions, shifting of these elements from one to the other locking position taking place upon a reversal of direction of operation of the motor-operated shaft M and having the effect of shifting the stroke of the connecting rod such as R, and hence causing the shifting of the stroke of the windshield wiper between a normal running condition and a parking position. The locking mechanism for linking the free end of the crank arm C with the connecting rod R comprises essentially a bolt element 30 and a receptacle element 40, one of said elements being rotatably carried by the crank arm C and the other of said elements being fixedly carried by the connecting rod R; and in the preferred construction the bolt element 30 is rotatably carried by the crank arm C, being rotatable in the crank pin 26 thereof, while the receptacle element 40 is fixed to the end of the connecting rod R and is designedly made an integral part thereof.

The bolt element 30 is shiftable in the receptacle element 40 between two bolt locking positions, one position being indicated in Figs. 3 and 10 and the other position being indicated in Figs. 4 and 12. The receptacle 40 is formed with two angularly disposed intercommunicating bolt locking cavities 42 and 44, the areas of which are defined respectively by the bolt positions indicated, for example, in Fig. 10 and Fig. 12. These cavities 42 and 44 are relatively displaced longitudinally of the connecting rod R (as, for example, with reference to the axis of the crank pin 26), whereby shifting of the bolt from one cavity to the other produces a shifting of the operating stroke of the connecting rod. Thus, shifting of the bolt 30 from the cavity 42 (Figs. 3 and 10) to the cavity 44 (Figs. 4 and 12) produces a shifting to the right of the operating stroke of the connecting rod R, and vice versa.

Means are provided for connecting a crank arm such as the crank arm C with its carried element such as the bolt 30, and causing both the crank arm and said carried element (bolt) to move together in fixed relation upon a reversal of direction of rotation of the crank arm, thereby causing the bolt and receptacle elements to rotate one relatively to the other, and to cause the bolt element to be shifted in the receptacle element from one to the other of the bolt locking positions. To effectuate this the bolt 30 is united to and preferably formed integrally with a friction disc 32 which contacts the contiguous face of the crank arm C. The parts are assembled together by interpositioning a friction thrust conical spring 50 between a washer 52 and the locking mechanism, a spring washer 54 being employed to hold the connecting rod R in contact with the disc 32 of the locking mechanism so as to minimize vibration in operation. The crank arms C and C' are keyed together through the medium of the crank pin 26 and the parts are held together by the nut 60 fitted on to the threaded end 56 of the crank pin.

The locking mechanism for connecting the free end of the arm C' with the connecting rod R' is similar in construction and operation to the locking device just described and the same will, therefore, be merely indicated by similar, but primed, reference characters. The only (and a minor) difference between the two is in the crank pin 26' which preferably is smaller in diameter than the crank pin 26, the crank pin 26' being integral at one end with the crank arm C' and being provided at the other end with a formation for receiving a spring washer 58'.

The operation during a normal running cycle, during a parking cycle produced by a reversal of the motor, and during a return from a parking position to a normal running cycle when the direction of rotation of the motor is returned to its normal direction may be explained by reference to the operation of the right hand windshield wiper W, it being understood that with the construction provided a similar operation in all of the changes of sequence takes place with the left hand windshield wiper W'. Assuming the parts to be in the normal running position indicated in Fig. 3 and Fig. 7, the motor-operated shaft M rotating in the clockwise direction indicated by the arrows in these figures, the friction exerted by the free end of the crank arm C on the disc 32 and hence on the bolt 30 tends to cause the bolt to be fixed to the crank arm and to rotate therewith. However, the bolt is locked at this time in the locking cavity 42 and is thereby prevented from further rotation. The bolt being thus locked to the connecting rod R reciprocates the connecting rod between the positions A and A-1 (see Figs. 7 and 9) which define the normal windshield wiping angle.

Figs. 8 through 12 (and the final position indicated in Fig. 4) illustrate in sequential views what takes place during a parking operation. To park the windshield wiper the customary control element is turned to parking position and at that instant the motor 20 reverses rotation, causing the compound crank C—C' to reverse its rotation. This may happen at any position of the crank and such a position is selectively shown in Fig. 8 as that immediately preceding position B. When the crank arm C reverses its direction of rotation (to counter-clockwise, as indicated, e. g., in Fig. 8) the friction at the free end of the crank arm C now exerted on the disc 32 and hence on the bolt 30 has the effect of fixing the bolt to the crank arm and since this bolt is now free to move in the cavity 42 the bolt will rotate from the position B to the position C of Fig. 8. When the parts arrive at position C the load active on the connecting rod R combined with the continued rotation of the crank arm causes the bolt 30 to slide or shift rearwardly first to a position such as position C (of Fig. 8) and then to rotate into the locking position, locked by the cavity 44 and indicated in Fig. 8 as position D. In the continued counter-clockwise rotation the parts now move without any further relative shifting of the locking mechanism from the position D of Fig. 8 to the parking position E shown in Fig. 9. By the shifting operation of the locking elements the operating stroke of the connecting rod R has been shifted to the right a distance to shift the stroke of the windshield wiper over the "parking angle" indicated in Fig. 9 of the drawings.

When the customary control element is moved back to the normal operating position and the motor-operated shaft M is again returned to its normal direction of operation, the reverse operation will take place and the locking elements will be shifted from the parked position shown in Fig. 9 through positions corresponding to those shown in Fig. 8, and back to the normal operating cycle positions shown in Fig. 7, the continued rotation of the motor-operated shaft causing the normal sequence of operation of the windshield wiper to take place in continued cycles. The inner wall of the cavity 44 is preferably provided with a short step 46 and suitable relief is provided at the opposite wall of the cavity 44 (see Figs. 10 and 12) to confine the bolt to an initial small angle of rotation to serve at a time when the control element is turned on and then quickly turned off again and thus to prevent too large an angular swing of the bolt under this operating condition.

In Figs. 13 to 16 we show a modification of the bolt element and the receptacle element designed to effect a smoother shifting of the bolt from one locking cavity to the other locking cavity and thus producing a smoother shifting of the operating stroke of the connecting rod. In these figures, Fig. 13 corresponds to Fig. 6, and Figs. 14 to 16 correspond, respectively, to Figs. 10 to 12, described above; and the parts of Figs. 13 to 16 which are similar or which correspond to the parts of Figs. 6 and 10 to 12, are designated by like reference characters, prefixed by the numeral "1."

In this modified construction the bolt 130 and the bolt locking cavities 142, 144 are provided with gear elements to assist in the shifting of the bolt from one locking cavity to the other locking cavity. These gear elements preferably comprise a one-tooth gear device consisting of the gear tooth 150 and the gear tooth cavity 152, located preferably medially of the bolt and receptacle elements, the gear tooth 150 being preferably formed in the bolt element 130 and the gear tooth cavity 152 being preferably formed in the receptacle element 140. To further assist in the smooth shifting of the parts, the walls of the cavity intermediate the cavities 142 and 144 are preferably cammed as at 154 for cooperation with the end walls or edges of the bolt element 130.

Figure 14:
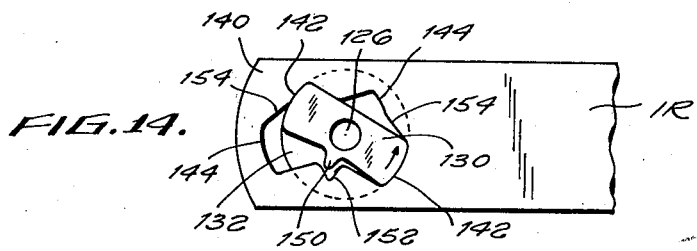
Figure 15:
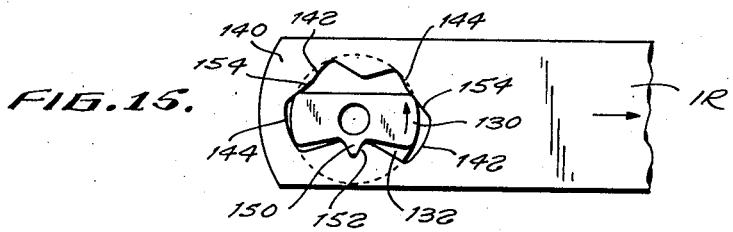
Figure 16:
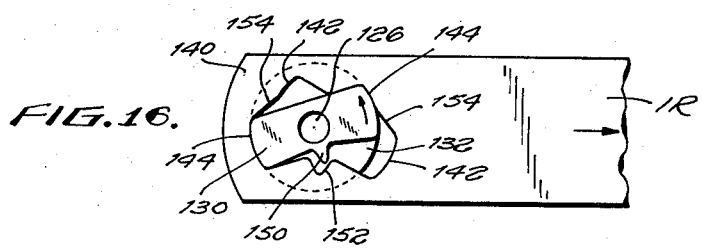

With this construction, during a shifting of the bolt element 130 from one locking cavity 142 to the other locking cavity 144 the action indicated sequentially in Figs. 14 to 16 takes place, the gear elements 150 and 152 moving into and out of intermeshing engagement; and the camming provided by the engagement between the camming walls 154 and the walls of the bolt element serves to assist in the shifting operation and in doing so produces a smoother and more uniform relative shifting of the parts upon reversal of the motor, this construction also enabling the shift to take place as soon as the motor reverses.

The provision of this described mechanism with a compound crank enables a unit apparatus to be devised which may be readily assembled between the motor-operated shaft and the left and right windshield wipers of a motor vehicle.

The construction and operation of the electric windshield wiper of the present invention will in the main be fully apparent from the above-detailed description thereof. By means of this apparatus, with the changeable or shiftable locking mechanism located at the connection between the free end of the crank arm and the connecting rod, the forces required to produce the shifting of the locking elements are reduced to a minimum and the effect of such forces is utilized under optimum conditions to do the necessary work. A very positive shifting of the locking elements to and from parking position is produced.

It will be apparent that while we have described the improved windshield wiper apparatus of the invention by reference to an exemplified structure, changes may be made in such apparatus without departing from the spirit of the invention defined in the following claims.

We claim:

1. An electric windshield wiper apparatus for connection with an oscillatable windshield wiper mechanism comprising a reversible motor-operated shaft, a crank arm fixed to the shaft, a reciprocable connecting rod for linking the free end of the crank arm and the oscillatable windshield wiper mechanism, the connecting rod being connected to and at the free end of the crank arm by means comprising a locking mechanism including a bolt element and a receptacle element, one of said elements being rotatably carried by the crank arm and the other of said elements being fixedly carried by the connecting rod, the bolt element being shiftable in the receptacle element between two bolt locking positions, the receptacle element being formed with two intercommunicating bolt locking cavities, said cavities being angularly disposed one with reference to the other and being relatively displaced longitudinally of the connecting rod whereby shifting of the bolt from one cavity to the other shifts the bolt from one to the other of the bolt locking positions and produces a shifting of the operating stroke of the connecting rod, means connecting the crank arm with its carried element for causing both the crank arm and said element to move together in fixed relation upon a reversal of direction of rotation of the crank arm, thereby causing the bolt and receptacle elements to rotate one relatively to the other for shifting the bolt element angularly in the receptacle element and causing the bolt element to be shifted longitudinally in the receptacle element and thereby shifting the bolt element from one to the other of said bolt locking positions.

2. An electric windshield wiper apparatus for connection with an oscillatable windshield wiper mechanism comprising a reversible motor-operated shaft, a crank arm fixed to the shaft, a reciprocable connecting rod for linking the free end of the crank arm and the oscillatable windshield wiper mechanism, the connecting rod being connected to and at the free end of the crank arm by means comprising a locking mechanism including a bolt element and a receptacle element, the bolt element being rotatably carried by the crank arm and the receptacle element being fixedly carried by the connecting rod, the bolt element being shiftable in the receptacle element between two bolt locking positions, the receptacle element being formed with two intercommunicating bolt locking cavities, said cavities being angularly disposed one with reference to the other and being relatively displaced longitudinally of the connecting rod whereby shifting of the bolt from one cavity to the other shifts the bolt from one to the other of the bolt locking positions and produces a shifting of the operating stroke of the connecting rod, means connecting the crank arm with the bolt element for causing both the crank arm and said bolt element to move together in fixed relation upon a reversal of direction of rotation of the crank arm, thereby causing the bolt and receptacle elements to rotate one relatively to the other for shifting the bolt element angularly in the receptacle element and causing the bolt element to be shifted longitudinally in the receptacle element and thereby shifting the bolt element from one to the other of said bolt locking positions.

3. An electric windshield wiper apparatus for connection with right and left oscillatable windshield wiper devices comprising a reversible motor-operated shaft, a compound crank fixed to the shaft having arms extending in opposite directions, reciprocable connecting rods for linking the free ends of the crank arms and the right and left oscillatable windshield wiper devices, each connecting rod being connected to and at the free end of one of the crank arms by similar means each comprising a locking mechanism including a bolt element and a receptacle element, the bolt element being rotatably carried by the crank arm and the receptacle element being fixedly carried by the connecting rod, the bolt element being shiftable in the receptacle element between two bolt locking positions, the receptacle element being formed with two angularly disposed intercommunicating bolt locking cavities, said cavities being relatively displaced longitudinally of the connecting rod whereby shifting of the bolt from one cavity to the other shifts the bolt from one to the other of the bolt locking positions and produces a shifting of the operating stroke of the connecting rod, means connecting the crank arm with the bolt element for causing both the crank arm and said bolt element to move together in fixed relation upon a reversal of direction of rotation of the crank arm, thereby causing the bolt and receptacle elements to rotate one relatively to the other for shifting the bolt element angularly in the receptacle element and causing the bolt element to be shifted longitudinally in the receptacle element and thereby shifting the bolt element from one to the other of said bolt locking positions.

4. The electric windshield wiper of claim 1 in which the bolt is contoured to fit each bolt locking cavity and to be free to move longitudinally in the intercommunicating space between the cavities.

5. The electric windshield wiper of claim 1 in which the bolt is contoured to fit each bolt locking cavity, said bolt and cavities being provided with gear elements to assist the shifting of the bolt from one locking cavity to the other locking cavity.

6. The electric windshield wiper of claim 5 in which the gear elements comprise a one-tooth gear device located medially of the bolt and receptacle elements.

References Cited in the file of this patent

UNITED STATES PATENTS

| | | |
|---|---|---|
| 2,027,362 | Anderson | Jan. 14, 1936 |
| 2,308,212 | Scott-Iversen | Jan. 12, 1943 |

FOREIGN PATENTS

| | | |
|---|---|---|
| 524,266 | Great Britain | Aug. 2, 1940 |